United States Patent
Cheng et al.

(10) Patent No.: US 11,359,110 B2
(45) Date of Patent: Jun. 14, 2022

(54) RADIATION CURABLE COMPOSITIONS WITH ANTI-STAIN PROPERTIES

(71) Applicants: ALLNEX Belgium S.A., Drogenbos (BE); ALLNEX Resins (Shanghai) Co., Ltd., Shanghai (CN)

(72) Inventors: Xie Cheng, Shanghai (CN); Steven Cappelle, Ninove (BE); Peter Burie, Ghent (BE); Dong Chen, Shanghai (CN); Rong Chen, Shanghai (CN)

(73) Assignees: ALLNEX BELGIUM S.A., Drogenbos (BE); ALLNEX RESINS (SHANGHAI) CO., LTD., Shanghai (CN)

( * ) Notice: Subject to any disclaimer, the term of this patent is extended or adjusted under 35 U.S.C. 154(b) by 264 days.

(21) Appl. No.: 16/334,424

(22) PCT Filed: Sep. 29, 2017

(86) PCT No.: PCT/CN2017/104568
§ 371 (c)(1),
(2) Date: Mar. 19, 2019

(87) PCT Pub. No.: WO2018/059561
PCT Pub. Date: Apr. 5, 2018

(65) Prior Publication Data
US 2019/0218418 A1   Jul. 18, 2019

(30) Foreign Application Priority Data

Sep. 30, 2016 (WO) ................ PCT/CN2016/101034

(51) Int. Cl.
C09D 175/16 (2006.01)
C08G 18/61 (2006.01)
C08G 18/67 (2006.01)
C09D 4/00 (2006.01)
C08G 18/75 (2006.01)
C08G 18/22 (2006.01)
C08K 9/00 (2006.01)
C09D 11/101 (2014.01)
C09D 11/102 (2014.01)
C09D 11/54 (2014.01)
C08F 222/10 (2006.01)

(52) U.S. Cl.
CPC ............ *C09D 175/16* (2013.01); *C08G 18/22* (2013.01); *C08G 18/61* (2013.01); *C08G 18/673* (2013.01); *C08G 18/6725* (2013.01); *C08G 18/755* (2013.01); *C08K 9/00* (2013.01); *C09D 4/00* (2013.01); *C09D 11/101* (2013.01); *C09D 11/102* (2013.01); *C09D 11/54* (2013.01); *C08F 222/1065* (2020.02)

(58) Field of Classification Search
None
See application file for complete search history.

(56) References Cited

U.S. PATENT DOCUMENTS

| | | |
|---|---|---|
| 2003/2008934 | 1/2003 | Zychowski et al. |
| 2003/0045598 A1 | 3/2003 | Chen et al. |
| 2008/0045623 A1* | 2/2008 | Yamaguchi ............ C03C 25/47 522/83 |
| 2010/0062225 A1* | 3/2010 | Takahashi ............ G02B 5/0278 428/172 |
| 2014/0287272 A1 | 9/2014 | Chang et al. |

FOREIGN PATENT DOCUMENTS

| | | |
|---|---|---|
| CN | 1984936 | 6/2007 |
| CN | 103849186 | 6/2014 |
| CN | 103938810 | 7/2014 |
| EP | 2583986 | 4/2013 |
| JP | 2006-045504 | 2/2006 |
| WO | 2013/060254 | 5/2013 |
| WO | WO2014/186135 | 11/2014 |

OTHER PUBLICATIONS

International Search Report dated Dec. 29, 2017 in International Application No. PCT/CN2017/104568.
Written Opinion of the International Searching Authority dated Dec. 29, 2017 in International Application No. PCT/CN2017/104568.

* cited by examiner

*Primary Examiner* — Jeffrey D Washville
(74) *Attorney, Agent, or Firm* — Wenderoth, Lind & Ponack, L.L.P.

(57) ABSTRACT

The radiation curable compositions (I) that comprise from 10 to 80 by weight of at least one silicone-modified urethane (meth) acrylate (A), from 0.5 to 60 by weight of at least one (meth) acrylated compound (B) bearing at least 5 (meth) acryloyl groups per molecule, and optionally, from 10 to 60% by weight of at least one compound (C) different from (A) or (B), wherein the weight percentages are on the total weight of the composition (I). These materials can be used for producing coatings, inks and overprint varnishes with excellent anti-stain properties, to their use and preparation. Materials of the invention are compatible with standard radiation curable materials. They allow to obtain excellent anti-stain properties for high gloss coatings as well as for matte coatings (II) with a gloss level at 60° of at most 15, even at most 10.

14 Claims, No Drawings

RADIATION CURABLE COMPOSITIONS WITH ANTI-STAIN PROPERTIES

FIELD OF THE INVENTION

The present invention relates to radiation curable compositions (I) for producing coatings, inks and overprint varnishes with excellent anti-stain properties, to their use and preparation. The compositions (I) of the invention are compatible with standard radiation curable materials. They allow to obtain excellent anti-stain properties for high gloss coatings as well as for matte coatings (II) with a gloss level at 60° of at most 15, even at most 10.

BACKGROUND OF THE INVENTION

Plastics coatings represent a significant and high growth segment of the coating industry and target the challenging requests for advanced surface finish technologies covering aesthetics as well as additional protective & functional features. The radiation curing technology has been used successfully in this industry for over 30 years and is especially renowned for superior hardcoat properties.

There is a demand for high performing hardcoats to balance a high hardness with a good scratch and abrasion resistance, boiling water resistance, flexible gloss levels and excellent anti-stain and/or anti-graffiti properties. In some segments such as consumer electronics (like mobile phone, computer, television, compact disk), the segments of automotive plastics for interior applications (like dashboard, trim) or exterior applications (like headlight, mirror, bumper, wheel cover) and the coating of industrial plastics (like film, label, box, toy, sport equipment, garden furniture), a low gloss level is desired for aesthetic reasons as finger-prints and smears will be less visible.

Generally, a silicone or fluoro additive with low surface energy is added into hardcoat formulations to obtain anti-stain and/or anti-graffiti properties. However, said additives have bad miscibility/compatibility with the hardcoating matrix. Moreover, it's challenging to balance the scratch/abrasion resistance and anti-stain or anti-graffiti properties, especially for low gloss coating with a gloss level at 60° of at most 15 or lower.

WO14/186135 discloses adhesive films for producing graphics comprising a polymeric film layer having on one major side a colored adhesive layer and on the opposite major side an anti-graffiti coating; The anti-graffiti coating is based on the (a) a major amount (>50 wt %) of one or more compounds having at least two free radical polymerizable groups and (b) a minor amount of one or more polysiloxane additives having two or more free radical polymerizable groups. No hardcoats are disclosed in this patent application. Coatings described have a high gloss finish.

EP2583986 (US2014/0287272) describes fluorinated compounds showing excellent anti-stain or anti-graffiti properties in high gloss coatings. However, when these materials are used in coatings with a gloss level at 60° of at most 15 or lower, then the anti-stain or anti-graffiti properties are not good enough. Furthermore, the formed thin stain resistance layers are easily damaged due to abrasion or scratch.

Fluorinated compounds are needed for finger print resistance as besides the water repellency they provide also oil repellency. A disadvantage of fluorinated compounds is their cost and poor compatibility with most radiation curable binders. This chemistry, as indicated above, has limitations for use in matte and dead matte coatings.

JP2006045504 discloses a radiation curable composition comprising a polysiloxane-containing polyisocyanate derivative [A] plus another ethylenically unsaturated compound [B]. The polysiloxane used to prepare compounds [A] is one that contains hydroxyl groups at only one terminal end. If compounds [C] are used, that are prepared from a polydimethylsiloxane diol (c1) having hydroxyl group at each terminal end, then this compound is always used in the presence of compounds [A].

Mono-hydroxy polysiloxanes have limited availability and are expensive, plus lead to other properties.

There is a continued demand for radiation curable compositions that permit to obtain hardcoats that after radiation curing demonstrate a superior chemical resistance against solvents or stains, and a superior mechanical resistance against scratch and abrasion. There is in particular a demand for hardcoats that balance a high hardness with a good scratch and abrasion resistance, boiling water resistance, flexible gloss levels and excellent anti-stain and/or anti-graffiti properties.

CONTENTS OF THE INVENTION

Against this background we now provide a radiation curable composition (I) comprising:
  from 10 to 80% by weight of at least one silicone-modified urethane (meth)acrylate (A)
  from 0.5 to 60% by weight of at least one (meth)acrylated compound (B) bearing at least 5 (meth)acryloyl groups per molecule, and
  optionally, from 0 to 60% by weight of at least one compound (C) different from (A) and (B),
  wherein the weight percentages are on the total weight of the composition (I).

Typically, the amount of compounds (A) in the composition (I) is from 15 to 75% by weight (wt %). Typically, the amount of compounds (B) used therein is from 0.8 to 50 w %. When present, compounds (C), typically are used in an amount from 10 to 60 wt %, more particular from 15 to 55 wt %.

In a preferred embodiment the radiation curable composition (I) consists essentially of:
  from 10 to 80 wt % of at least one silicone-modified urethane (meth)acrylate (A)
  from 0.5 to 60 wt % of at least one (meth)acrylated compound (B) bearing at least 5 (meth)acryloyl groups per molecule, and
  optionally, from 0 to 60 wt % of at least one compound (C) different from (A) and (B),
  wherein the weight percentages are on the total weight of the composition (I).

Preferred amounts of compounds (A), compounds (B) and the optional compounds (C) are as given above.

By 'essentially consisting of' as used herein is meant that the composition (I) of the invention is comprised for at least 90% by weight (wt %), preferably by at least 95 wt %, more preferably by at least 98 wt %, even more preferably by at least 99 wt % of compounds (A), (B), and where present (C). Most typically the weight percentages of (A), (B), and where present (C) sum up to 100%.

By the term '(meth)acrylated' compound is meant a compound that comprises at least one (meth)acryloyl group. By '(meth)acryloyl' is meant acryloyl, methacryloyl or a mixture of both.

The at least one silicone-modified urethane (meth)acrylate (A) typically is prepared from:

at least one polysiloxane (i) having at least one isocyanate reactive group,
at least one polyisocyanate (ii) and
at least one compound (iii) having at least one (meth) acryloyl group and at least one isocyanate reactive group.

Possibly the silicone-modified urethane (meth)acrylate (A) is further prepared from a further compound (iv) with at least one isocyanate reactive group, that is different from any of compounds (i) to (iii). The isocyanate reactive groups typically are: hydroxyl groups, amino groups and/or thiol groups (see below). Possibly compounds (iv) comprise at least two hydroxyl groups per molecule and are for instance selected from one or more of: hydroxyl group containing polyester (meth)acrylates, hydroxyl group containing polyether (meth)acrylates, hydroxyl group containing polyether ester(meth)acrylates, hydroxyl group containing polyepoxy (meth)acrylates and hydroxyl group containing (meth)acrylated (meth)acrylics. Typically such compounds have a hydroxyl functionality of 2 or higher. In an embodiment of the invention compounds (iv) are being used to prepare urethane (meth)acrylates (A) according to the invention. In another embodiment of the invention no compounds (iv) are being used to prepare urethane (meth)acrylates (A) according to the invention.

Polysiloxanes (i) according to the invention have at least one isocyanate reactive group, typically at least 2 isocyanate reactive groups. Often they comprise two isocyanate reactive groups per molecule. With the term 'isocyanate reactive group' or the term 'reactive group capable to react with isocyanate groups' is meant a functional group that will react with an isocyanate group under typical reactive conditions for reacting an isocyanate group. Examples of such groups are: hydroxyl groups, amino groups and/or thiol groups. Preferred in the context of the invention are amino groups and/or hydroxyl groups. Amino groups can be —NH or —NH2 groups. Most preferred however are hydroxyl groups. Most typically polysiloxanes (i) of the invention are diols Suitable polysiloxanes (i) include: linear or branched polydialkyl siloxanes, linear or branched polyalkylaryl siloxanes and/or linear or branched polydiarylsiloxanes. Preferred are polydialkyl siloxanes which may be linear or branched but most typically are linear.

The isocyanate reactive groups can be situated at the end of the polymer chain, i.e. in the end group of the polymer backbone and/or in a terminal portion of side chains. In a preferred embodiment of the invention, the isocyanate reactive groups (typically hydroxyl groups) are comprised in the end groups of the polysiloxane backbone.

Preferred in the context of the invention are polysiloxanes (i) that comprise one or more hydroxyl groups. Most preferred are hydroxyl terminated polydialkyl siloxanes and even more in particular linear hydroxyl terminated polydialkyl siloxanes. Usually hydroxyl groups are present at both terminal ends. The 'alkyl' group most typically is a C1 to C4 alkyl group and most typically is a methyl group.

Optionally, compounds (i) of the invention can comprise one or more fluoro groups. Polysiloxanes (i) according to the invention can hence be fluoro-modified polysiloxanes or fluorinated polysiloxanes. In another embodiment, however, the polysiloxanes (i) do not comprise any fluoro groups.

Polysiloxanes (i) according to the invention may bear a certain amount of alkoxy groups such as ethoxy (EO) and/or propoxy (PO) groups. Preferred in the context of the invention are polysiloxanes (i) according to Formula I:

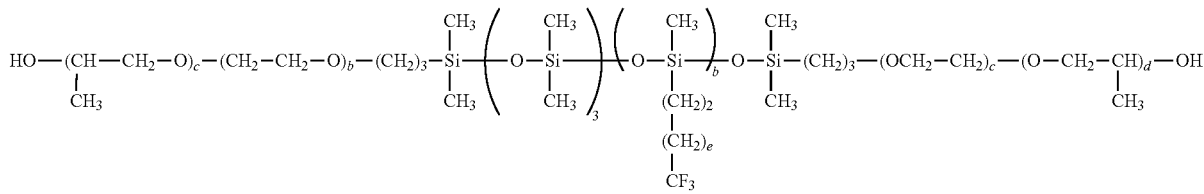

wherein 'a' is an integer from 1 to 250, preferably from 1 to 150, more preferably from 1 to 100; wherein 'b' is an integer from 0 to 100, preferably from 0 to 50, more preferably from 0 to 30 and most preferably from 0 to at most 20; wherein 'c' and 'd' are integers from 0 to 200, preferably from 0 to 150, more preferably from 0 to 100 and most preferably from 0 to at most 50; and wherein 'e' is an integer from 0 to 50, preferably from 0 to 50, more preferably from 0 to 35 and most preferably from 0 to at most 20.

Particularly preferred are compounds (i) that are represented by Formula II:

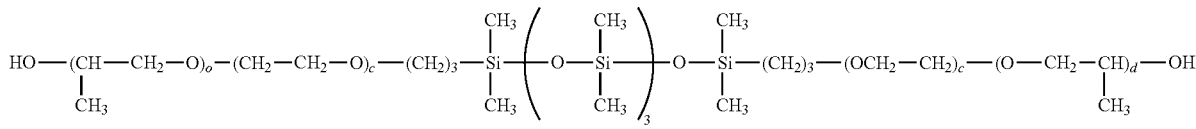

wherein 'a' is an integer from 1 to 250, preferably from 1 to 150, more preferably from 1 to 100; and wherein 'c' and 'd' are integers from 0 to 200, preferably from 0 to 150, more preferably from 0 to 100 and most preferably from 0 to at most 50.

Typically the polysiloxanes (i) of the invention having at least one isocyanate reactive group comprise between 5 and 100 —SiO— units, more preferably between 5 and 70 —SiO— units.

Suitable examples of polysiloxanes (i) include but are not limited to IM11, IM15, IM22, IM47 (diols), FLUID NH 15 D, FLUID NH 40D, FLUID NH 130D (diamines), FLUID OH 15D, FLUID OH 40D (hydroxyl) (all available from Wacker, Germany), KF-8010, X-22-161A, X-22-161B, KF-8012, KF-8008 (diamine end groups), KF-665, KF-664 (amine-ending pendent groups), X-22-167B (dithiol end groups), KF-2001, KF-2004 (thiol-ending pendent groups) KF-6001 and KF-6002 (diols) (all available from Shin-Etsu, Japan), Silmer OH10, Fluorosil C7-F, Silsurf Di-2510, Silsurf Di-1010, Silsurf Di-1508, Silsurf Di-2021 and Silsurf Di-5018-F (all available from Siltech, the Netherlands), Q4-3667 (available from Dow Corning, the US), heying 7585 (available from Shanghai Heyin Chemical, China).

Polysiloxanes (i) of the invention typically have a molecular weight MW of between 700 and 40.000 Daltons. Usually the MW is at most 20.000 Daltons, typically at most 12.000 Daltons, and most typically at most 9.000 Daltons. Molecular weights MW can be measured by gel permeation chromatography using polystyrene standards but most typically they are calculated from the target molecule.

In general the hydroxyl value (IOH) of polysiloxanes (i) of the invention is between 1 and 500, more preferably between 5 and 250, even more preferably of between 5 and 150.

By a 'polyisocyanate' (ii) is meant to designate a compound containing at least two isocyanate groups. Typically the polyisocyanate contains not more than six isocyanate groups, more preferably however not more than three isocyanate groups.

Aromatic, araliphatic, aliphatic or cycloaliphatic polyisocyanates and mixtures of such isocyanates may be used. Preferred are di-isocyanates of the formula R (NCO)2, wherein R represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable isocyanates include xylylene diisocyanate, tetramethylene diisocyanate, 1,4-diisocyanatobutane, 1,12-diisocyanatododecane, pentamethylene diisocyanate, hexamethylene diisocyanate, 2,3,3-trimethylhexamethylene diisocyanate, 2,2,4- and 2,4,4-trimethyl-hexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α, α, α', α'-tetramethyl-m- or -p-xylylene diisocyanate as well as mixtures thereof. The above list is not exhaustive.

Also suitable are monomeric tri-isocyanates such as 4-isocyanatomethyl-1,8-octamethylene diisocyanate or triphenylmethane 4,4',4''-triisocyanate. Polyisocyanate adducts containing isocyanurate, iminooxadiazine dione, urethane, biuret, allophanate, uretidione and/or carbodiimide groups are also useful as the isocyanate component (ii). Such polyisocyanates may have isocyanate functionalities of 3 or more. Such isocyanates are prepared by the trimerization or oligomerization of di-isocyanates or by the reaction of di-isocyanates with polyfunctional compounds containing hydroxyl or amine groups.

Preferred in the context of the invention are aliphatic and/or cycloaliphatic polyisocyanates. Most preferred are aliphatic polyisocyanates (ii). Di-isocyanates and more in particular aliphatic di-isocyanates are generally preferred such as isophorone di-isocyanate. In addition to di-isocyanates, tri- and higher functional isocyanates can be used. Useful examples include isocyanurates e.g., cyclic trimer of hexamethylene di-isocyanate and cyclic trimer of isophorone di-isocyanate, and biurets containing tri-isocyanates.

Compounds (iii) according to the invention are in general hydroxyl functional (meth)acrylates and more in particular '(meth)acryloyl mono-hydroxy' compounds, whereby is meant to designate compounds comprising one hydroxyl group and one or more (meth)acryloyl groups. Often these compounds comprise two or more (meth)acryloyl groups, even three or more (meth)acryloyl groups. Acrylates are particularly preferred. Typically compounds (iii) are different from compounds (i) and where present compounds (iv).

Suitable are for instance the esterification products of aliphatic and/or aromatic polyols with (meth)acrylic acid having a residual average hydroxyl functionality of about 1.

Examples of suitable hydroxyl functional (meth)acrylates (iii) include but are not limited to hydroxyethyl (meth)acrylate, hydroxypropyl (meth)acrylate, hydroxybutyl (meth)acrylate, polyethyleneoxide mono(meth)acrylate, polypropyleneoxide mono(meth)acrylate, or any of those hydroxylated monomers further reacted with lactones or lactides which add to these hydroxyls in a ring-opening reaction.

Suitable are also the esterification products of aliphatic and/or aromatic polyols with (meth)acrylic acid having a residual average hydroxyl functionality of about 1 or higher. The partial esterification products of (meth)acrylic acid with tri-, tetra-, penta- or hexahydric polyols or mixtures thereof are preferred but it is also possible to use reaction products of such polyols with ethylene oxide and/or propylene oxide or mixtures thereof, or the reaction products of such polyols with lactones or lactides which add to these polyols in a ring-opening reaction until the desired residual hydroxyl functionality is reached. It is known to those skilled in the art that the (meth)acrylation of polyols proceeds to a mixture of (meth)acrylate components and that an easy and suitable way to characterize the mixture is by measuring its hydroxyl value (mg KOH/g). Suitable compounds (ii) are for instance the (meth)acrylic esters of linear and branched polyols in which at least one hydroxy functionality remains free. Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Preferred in the context of the invention are mono hydroxy poly(meth)acryoly compounds, whereby is meant to designate compounds comprising on average one hydroxyl groups and at least two (meth)acryloyl groups.

Particularly preferred are compounds (iii)(a) with one hydroxyl group and at least 3 (meth)acryloyl groups per molecule. Particularly preferred are e.g. pentaerythritol triacrylate, (poly)ethoxylated and/or (poly)propoxylated pentaerythritol triacrylate, ditrimethylolpropane triacrylate and/or dipentaerythrytol pentaacrylate. Most preferred are pentaerythritol triacrylate (PETIA), (poly)ethoxylated and/or (poly)propoxylated pentaerythritol triacrylate and mixtures of both.

Possibly one or more compounds (iii)(a) are used in combination with one or more compounds (iii)(b) that bear one (or on average one) hydroxyl group and 2 (meth)acryloyl groups per molecule such as glycerol diacrylate, trimethylolpropane diacrylate, etc.

The amount of polysiloxanes (i) used for the synthesis of silicone-modified urethane (meth)acrylates (A) of the invention is generally in the range of from 10 to 95 percent by weight (wt %), preferably from 20 to 95 wt % and more preferably from 30 to 95 wt %. Weight percentages are herein relative to the total weight of compounds used to prepare the silicone-modified urethane (meth)acrylate (A).

The amount of polyisocyanates (ii) used for the synthesis of silicone-modified urethane (meth)acrylates (A) of the invention is generally in the range of from 1 to 28 percent by weight (wt %), preferably from 2 to 25 wt % and more preferably from 2 to 21 wt %. Weight percentages are herein relative to the total weight of compounds used to prepare the silicone-modified urethane (meth)acrylate (A).

The amount of compounds (iii) used for the synthesis of silicone-modified urethane (meth)acrylates (A) of the invention is generally in the range of from 1 to 60 percent by weight (wt %), preferably from 4 to 53 wt % and more preferably from 4 to 46 wt %. Weight percentages are herein relative to the total weight of compounds used to prepare the silicone-modified urethane (meth)acrylate (A).

When used, the amount of compounds (iv) used for the synthesis of the silicone-modified urethane (meth)acrylates (A) of the invention is generally in the range of from 0 to 50 percent by weight (wt %), preferably from 0 to 40 wt % and more preferably from 0 to 30 wt %. Weight percentages are herein relative to the total weight of compounds used to prepare the silicone-modified urethane (meth)acrylate (A).

In an embodiment of the invention, the sum of the weight percentages of compounds (i), (ii), and (iv) equals 100%. In a preferred embodiment of the invention, however, the sum of the weight percentages of compounds (i), (ii), and (iii) equals 100%.

Compounds (A) of the invention typically have a weight average molecular weight Mw of from 1000 to 80000, more preferably from 1000 to 60000 and most preferably 1000 to 50000 Daltons. Typically the number average molecular weight is from 1000 to 40000, more preferably from 1000 to 30000 and most preferably 1000 to 25000 Daltons. Molecular weights typically are measured by gel permeation chromatography (GPC) in case of higher molecular weight molecules. Therefore, a small portion of the oligomer is dissolved in tetrahydrofuran (THF) and injected in the liquid chromatograph after a preliminary filtration. The components of the sample are typically eluted by the mobile phase solvent (THF) at a flow rate of 1 ml/min and separated by a combination of polystyrene-divinylbenzene columns at a temperature of 40° C. Standards of polystyrene with known molecular weight and narrow polydispersity are used to generate a calibration curve.

Compounds (B) of the invention comprise at least 5, typically at least 6 or more (meth)acryloyl functional groups per molecule. Typically their functionality is at most 15, more typically at least 10. Typically compounds (B) according to the invention are characterized by an amount of (meth)acryloyl groups of at least 4 meq/g, typically at least 5 meq/g, preferably at least 6 meq/g, more preferably at least 7 meq/g, even more preferably at least 8 meq/g, and most preferably at least 9 meq/g. Typically the amount of (meth)acryloyl does not exceed 13 meg/g, more preferable does not exceed 12 meq/g. Preferred in the context of the invention are (meth)acrylated compounds (B) that combine a functionality as indicated above with a degree of unsaturation as indicated above.

The amount of ethylenically unsaturated groups ((meth)acryloyl groups in casu) is usually measured by nuclear magnetic resonance spectroscopy (NMR) and is expressed in meq per g of solid material. A sample of dry product is dissolved in N-methylpyrolidinone. This sample is submitted to 1H-NMR analysis in order to measure the molar concentration of ethylenically unsaturated groups using 1,3,5-bromobenzene as internal standard. The comparison between the peak assigned to aromatic protons of the internal standard and the peaks assigned to the ethylenically unsaturated double bonds allow to calculate the molar concentration of ethylenically unsaturated groups according to the formula $(A \times B)/C$ wherein A is the integration of 1H double bonds provided by the sample, B is the number of moles of the internal standard in the sample and C is the integration of 1H provided by the internal standard. Alternatively, the amount of ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

Most typically compounds (B) are selected from urethane (meth)acrylates (B1) and/or polyester (meth)acrylates (B2) and/or (meth)acrylated pol(meth)yacrylics (B3). Preferred are urethane (meth)acrylates and more in particular urethane acrylates.

Urethane (meth)acrylates (B1) according to the invention in general are obtained from the reaction of at least one polyisocyanate (ii), at least one (meth)acrylated (iii) containing at least one reactive group capable to react with isocyanate groups, and, optionally at least one diol (iv) as described above. Typically the reactive group capable to react with isocyanate groups is a hydroxyl group.

Urethane (meth)acrylates (B1) in the context of the invention are different from compounds (A). Typically they do not contain any compounds (i) in their backbone. Typically compounds (B1) according to the invention do not comprise any silicone units or any fluoro containing groups. Typically the sum of the weight percentages of compounds (ii) and (iii) used to prepare the urethane (meth)acrylate (B1) equals 100%. In an embodiment of the invention, compounds (ii) and (iii) used for preparing compounds (B1) or the same as used in the preparation of compounds (A).

Typically urethane (meth)acrylates (B1) that are used in the invention have a molecular weight MW of between 400 and 20,000 Daltons. Usually the MW is at most 5,000 Daltons, typically at most 2,000 Daltons, and most typically at most 1,000 Daltons. Molecular weights MW can be measured by gel permeation chromatography using polystyrene standards but most typically they are calculated from the target molecule.

Examples of suitable urethane (meth)acrylates (B1) are those commercialized as EBECRYL® 1290, EB1290N, EBECRYL® 220, EBECRYL® 270, EBECRYL® 264, EBECRYL® 294/25HD, EBECRYL® 4883, EBECRYL® 5129, EBECRYL® 8210, EBECRYL® 8602, EBECRYL® 8415, EBECRYL® 225 and EBECRYL® 9260. These urethane (meth)acrylates can be diluted in a reactive diluent or be used in combination with other (meth)acrylated compounds. Preferred are EBECRYL® 1290, EB1290N, EBECRYL® 5129, EBECRYL® 8602, EBECRYL® 8415, EBECRYL® 225 and EBECRYL® 9260.

Polyester (meth)acrylates (B2) used in the invention typically are obtained from the reaction of at least one polyol and at least one ethylenically unsaturated carboxylic acid (v) or a suitable equivalent. Examples of suitable compounds (v) include (meth)acrylic acid, β-carboxyethyl(meth)acrylate, crotonic acid, iso-crotonic acid, maleic acid, fumaric acid, itaconic acid, citraconic acid, 3-(meth)acrylamido-3-methylbutanoic acid, 10-(meth)acrylamido-undecanoic acid, 2-(meth)acrylamido-2-hydroxyacetic acid, vinyl acetic acid and/or allyl acetic acid. Acrylic acid and methacrylic acid, used alone or in combination, are preferred.

Typically polyester (meth)acrylates (B2) have a molecular weight MW of between 200 and 20,000 Daltons. Usually the MW is at most 5,000 Daltons, typically at most 1,000 Daltons, most typically at most 500 Daltons.

Suitable polyester (meth)acrylates (B2) are for instance those commercialized as CN2295, CN291, CN 293, CN9210, CN921, CN9400 (all available from Sartomer, France), EBECRYL® 450, EBECRYL® 837, EBECRYL® 870 EBECRYL® 820, EBECRYL® 873 and EBECRYL® 895 (all available from Allnex, Belgium), Dipentaerythritol penta-/hexa-acrylate and the like.

(Meth)acrylated poly(meth)acrylics (B3) used in the invention typically are obtained by free-radical polymerization. Typically compounds (B3) are prepared by the radical polymerization of (meth)acrylic monomers in the presence of thermal radical initiators, transfer agents and optional (reactive) solvents; a chemical functionality is introduced on the acrylic backbone to ensure the subsequent grafting with suitable mono- or poly-(meth)acrylated compounds. For example, the (meth)acrylic oligomer bears carboxylic acid functionality and is grafted with glycidyl (meth)acrylate (or vice versa). Examples of suitable compounds (B3) include EBECRYL® 1200, EBECRYL® 1700 and EBECRYL® 1701.

Optionally, compositions (I) of the invention can further comprise at least one compound (C) that is different from compounds (A) and different from compounds (B). In an embodiment of the invention compounds (C) are organic solvents (C1). No particular restriction is given to non-reactive organic solvents (C1) that may be used in the invention, including propylene glycol monomethylether acetate, propyleneglycol monomethylether, ethylene glycol monomethylether, butyl acetate, methyl ethyl ketone, methyl isobutyl ketone and isopropyl alcohol.

Compounds (C) can also be reactive diluents (C2), which typically are (meth)acrylated monomers. An example of suitable monomers (C2) are alkyl (meth)acrylates represented by a formula $CH_2=C(R1)COOC_zH_{2z+1}$, wherein R1 is a hydrogen atom or a methyl group, and z is an integer of from 1 to 13, provided that $C_zH_{2z+1}$ may have a straight chain structure or a branched structure. Suitable examples include but are not limited to: allyl (meth)acrylate, benzyl (meth)acrylate butoxyethyl (meth)acrylate, butanediol (meth)acrylate, butoxytriethylene glycol mono(meth)acrylate, t-butylaminoethyl (meth)acrylate, 3-chloro-2-hydroxypropyl (meth)acrylate, 2-cyanoethyl (meth)acrylate, cyclohexyl (meth)acrylate, 2,3-dibromopropyl (meth)acrylate, dicyclopentenyl (meth)acrylate, N,N-diethylaminoethyl (meth)acrylate, N,N-dimethylaminoethyl (meth)acrylate, 2-ethoxyethyl (meth)acrylate, 2-(2-ethoxyethoxy)ethyl (meth)acrylate, 2-ethylhexyl (meth)acrylate, glycerol (meth)acrylate, glycidyl (meth)acrylate, heptadecafluorodecyl (meth)acrylate, 2-hydroxyethyl (meth)acrylate, 2-hydroxy-3-(meth)acryloyloxypropyltrimethylammonium chloride, 2-hydroxypropyl (meth)acrylate, [gamma]-(meth)acryloxypropyltrimethoxysilane, 2-methoxyethyl (meth)acrylate, methoxydiethylene glycol (meth)acrylate, methoxytriethylene glycol (meth)acrylate, methoxytetraethylene glycol (meth)acrylate, methoxydipropylene glycol (meth)acrylate, methoxylated cyclodecatriene (meth)acrylate, morpholine (meth)acrylate, nonylphenoxypolyethylene glycol (meth) acrylate, nonylphenoxypolypropylene glycol (meth)acrylate, octafluoropentyl (meth)acrylate, phenoxyhydroxypropyl (meth)acrylate, phenoxyethyl (meth)acrylate, phenoxydiethylene glycol (meth)acrylate, phenoxytetraethylene glycol (meth)acrylate, phenoxyhexaethylene glycol (meth)acrylate, phenoxy (meth)acrylate, polypropylene glycol (meth)acrylate, sodium 2-sulfonate ethoxy (meth)acrylate, tetrafluoropropyl (meth)acrylate, tetrahydrofurfuryl (meth)acrylate, trifluoroethyl (meth)acrylate, hexafluoroisopropyl acrylate, vinyl acetate, N-vinyl caprolactam, N-vinylpyrrolidone, dicyclopentadienyl (meth)acrylate and/or isobornyl acrylate. Preferred however are monomers with at least 2, more preferably at least 3 polymerizable functional groups such as (meth)acryloyl groups. Examples of poly-unsaturated compounds from this category are trimethylolpropane tri-(meth)acrylate, glycerol tri-(meth)acrylate, pentaerythritol tri,tetra-(meth)acrylate, pentaerythritol tetra-(meth)acrylate, di-trimethylolpropane tetra-(meth)acrylate, di-pentaerythritol hexa-(meth)acrylate and their (poly) ethoxylated and/or (poly)propoxylated equivalents, as well as mixtures thereof. The acrylated forms hereof are preferred. Most preferred are di- and/or tri-acrylates.

In general the amount of silicone-modified urethane (meth)acrylates (A) in compositions (I) of the invention is from 10 to 80% by weight (wt %), more preferably from 15 to 75 wt %, and most preferably from 20 to 70 wt %.

In general the amount of (meth)acrylated compounds (B) having at least 5 (meth)acryloyl groups per molecule is from 0.5 to 60% by weight (wt %), more preferably from 0.8 to 50 wt %, and most preferably from 1.0 to 45 wt %.

In general the amount of (meth)acrylated compounds (C) other than (A) or (B) in compositions (I) of the invention is from 0 to 60% by weight (wt %), often from 10 to 60 w %, more preferably from 15 to 55 wt %, and most preferably from 15 to 50 wt %.

Compositions (I) of the invention can be prepared in many different ways. For instance all compounds may be added in one pot in sequence or at the same time but there are other ways to prepare these compositions. Amounts can be added in one or more steps. In an embodiment of the invention, compounds (B) and compounds (C), where present, are added to compounds (A). In another embodiment of the invention, part or all of compounds (B) are formed in situ during the formation of compounds (A). In said case the compounds (ii) and (iii) from which compounds (B) are prepared are the same as the ones used in the preparation of compounds (A).

Compounds (A) according to the invention may be prepared by putting the ingredients (i), (ii), (iii) and where present (iv) together in a 1-pot reaction. Typically however only compounds (i), (ii) and (iii) are used to make compounds (A). In an embodiment of the invention compounds (i) are first reacted with compounds (ii) and then with compounds (iii). Typically compounds (A) are then prepared by reacting, in a first step, compounds (i) with an excess of compounds (ii) and by reacting, in a further step, the reaction product of step 1 with compounds (iii). Typically a molar excess of compounds (ii) is used in this first step. By an excess of compounds (ii) is meant in particular that the molar equivalent ratio of isocyanate groups of compound (ii) to the hydroxyl groups of compound (i) is higher than 2. Compounds (B) and (C) can then be added during or after the formation of compounds (A). Typically in this case the molar equivalent ratio of the isocyanate groups in compounds (ii) to the hydroxyl groups of compounds (i) used to prepare compounds (A) is from 2:1 to 10:1. Preferably however, this ratio is from 2.5:1 to 6:1 and most typically from 2.5:1 to 4:1. The molar equivalent ratio of isocyanate reactive groups of compounds (iii) to the remaining isocyanate groups after reaction of compounds (i) and (ii) is from 2 to 0.8. More typically however this ratio is from 1.5 to 0.9 and most typically from 1.2 to 0.9.

In an even more preferred embodiment of the invention, compounds (A) are prepared by reacting, in a first step, compounds (ii) with compounds (iii) and by reacting, in a further step, the reaction product of step 1 with compounds (i). Preferably a molar excess of compounds (iii) is used in this first step. In this case by excess of compounds (iii) is meant in particular that the molar equivalent ratio of the isocyanate groups of compound (ii) is to the hydroxyl groups of compound (iii) is lower than 2. Part or all of the amount of compounds (B) can then be formed in situ depending on the amount (excess) of compounds (iii) used. Extra (B) and/or (C), if desired, can then be added during or after the formation of compounds (A). In this case the molar equivalent ratio of the isocyanate groups in compounds (ii) to the hydroxyl groups of compounds (iii) used to prepare compounds (A) is from 2:1 to 1.1:1. Preferably however this ratio is from 1.8:1 to 1.2:1 and most typically from 1.6:1 to 1.3:1. The molar equivalent ratio of isocyanate reactive groups of compounds (i) to the remaining isocyanate groups after reaction of compounds (i) and (ii) is from 1.2 to 0.8. More typically however this ratio is from 1.1 to 0.9 and most typically from 1.05 to 0.95.

The reactions can be carried out in a solvent and under conditions known in the art, typically in the presence of a catalyst. Suitable catalysts include tin salts or complexes such as dibutyltin dilaurate, stannous octanoate, stannous oleate, tin dibutyldi-(2-ethyl hexanoate), stannous chloride, salts or complexes of bismuth, zinc, zirconium, aluminum and others known in the art. The amount of catalyst present will depend on the particular reaction. Generally, suitable catalyst concentrations are from about 0.001 to about 10% by weight, particularly suitable between about 0.01% and about 1% by weight based on the total weight of reactants.

Compositions (I) of the invention are suitable for the preparation of a coating composition, an ink, an overprint varnish. They can also be used in the making of composite materials. An aspect of the invention relates to such use. Another aspect of the invention relates to a coating composition, an ink, an overprint varnish prepared from a composition (I) of the invention. Compositions (I) of the invention are compatible with most of the radiation curable compounds used in the art. They are further compatible with most additives used standard in the art. An aspect of the invention hence relates to a radiation curable composition (II) that is prepared from a composition (I) according to the invention.

An aspect of the invention relates to coating compositions (II) that comprise or are prepared from compositions (I) of the invention. In an embodiment of the invention the coating composition (II) is a hard coat composition. A particular embodiment of the invention relates to hardcoats that can be obtained from a composition of the invention.

Compositions (II) of the invention in particular permit to obtain hardcoats which show after radiation curing a superior chemical resistance against solvents or stains, and a superior mechanical resistance against scratch and abrasion. Hardcoats prepared from compositions (I) or (II) or the invention in particular balance a high hardness with a good scratch and abrasion resistance, boiling water resistance, flexible gloss levels and excellent anti-stain and/or anti-graffiti properties.

These coatings can be applied to any surface to which the coating of the invention can adhere, either temporarily or permanently. The surfaces may be flexible or rigid. The material can be woven or now-woven. The surface can be made from a material which is fabric, glass, metal, metalloid, metal oxide, ceramic, wood, plastic, resin, rubber, stone, concrete, fittings in electronics, a semiconductor, a particle or a combination thereof.

Preferred substrates are metal, wood, and plastics like PVC, PC, ABS, PC/ABS, HIPS, PMMA, and PET. The coatings obtained typically are colorless and transparent and they show superior abrasion resistance, superior scratch resistance, good boiling water resistance and excellent anti-stain or anti-graffiti properties without matting agents for high gloss level or with matting agents for a gloss level at 60° of at most 15, preferably at most 10. The coating surface is smooth and possible to be further formulated to obtain smooth, silky, peach or warm feeling haptic coating.

Hardcoats for plastics like PVC, PC, ABS, PC/ABS, HIPS, PMMA, and PET are particularly envisaged in the frame of the invention. The product applications in this industry segment are endless and they can be typically associated to consumer electronics (like mobile phone, computer, television, compact disk), to automotive plastics for interior applications (like dashboard, trim) or exterior applications (like headlight, mirror, bumper, wheel cover) and to industrial plastics (like film, label, box, toy, sport equipment, garden furniture), to packaging (vacuum metalization) etc. Hardcoats of the invention can be applied on many materials, substrates and equipments such as appliances, medical devices, cosmetic packaging, consumer electronic goods etc.

Hardcoats of the invention after curing typically have Pencil hardness on ABS or PC as measured by appropriate equipment of at least B, preferably at least HB, and most preferably at least F.

Typically coating compositions (II) of the invention are used to make top coats.

The compositions (I) and (II) of the invention are also suitable for use in overprint varnishes and inks. An aspect of the invention relates to the use of compositions of the invention for the making of coatings (including overprint varnishes) and inks (both for contact and non-contact printing methods like inkjet). Another aspect concerns the making of these coatings, overprint varnishes and inks from a composition of the invention. In particular, the composition of the invention can contain additional pigments and/or colorants. Yet another aspect of the invention relates to inks, or overprint varnishes comprising a composition of the invention, or prepared from a composition of the invention.

Yet another aspect of the invention relates to a process of coating an article or a substrate, at least in part, said method comprising the step of applying a composition of the invention to at least one surface of the article or the substrate, followed by a step of curing using e.g. active energy rays. The active energy rays used for curing preferably are ultraviolet rays, electron beam, X-rays, radioactive rays or high frequency waves. Ultraviolet rays having a wavelength of from 180 to 450 nm are particularly preferred from economical viewpoint. Curing by irradiation may be followed by thermal curing in the presence of suitable external cross linkers.

In a particular embodiment of the invention the article or substrate comprises plastic, more in particular is made from plastic such as PVC, PC, ABS, PC/ABS, HIPS, PMMA, or PET.

Compositions of the invention typically are cured by ultraviolet irradiation, generally in the presence of photo-initiator; they can also be cured by electron-beam irradiation, allowing the use of compositions free of photo-initiator. The compositions according to the invention are providing extremely rapid curing characterized by a higher reactivity allowing higher line speed or less irradiative energy curing and increased productivity. Low energy ultraviolet light sources can also be used (LED lamps).

Coating compositions (II) of the invention typically comprise from 5 to 95% by weight of a radiation curable composition (I) according to the invention. Optionally coating compositions (II) of the invention may comprise from 0 to 30% by weight of at least one organic and/or inorganic matting agent (D), relative to the total weight of the composition (II).

Compositions (II) of the invention are further also suitable for the making of matt coatings. No high loads of matting agents are needed to achieve a satin, matt or even a dead matt effect. Advantageously, a gloss level of at most 80, preferably at most 60, more preferably at most 50 and most preferably at most 45 is obtained at 85° angle. In general the 60° gloss level is at most 50 (satin). Preferred though are 'dead matt' coatings with a 60° gloss level upon curing that typically is as most 15, preferably at most 10, more preferably at most 8 and most preferably at most 7. In some cases the 60° gloss level of the matt coating upon curing is at most 5, in particular cases it may even be as low as 1-2. The above gloss levels are for coatings that have a dry thickness (thickness after curing) of 12 μm. In general the above gloss levels can be obtained for coatings with a dry thickness of from 6 to 120 μm.

Typically matt coating composition (II) of the invention comprise from 5 to 95% by weight of a radiation curable composition (I) according to the invention and from 0.5 to 30% by weight of at least one organic and/or inorganic matting agent (D) (like silica and/or waxes).

Standard inorganic matting agents (D1) include silica (for example amorphous silicon dioxide), diatomaceous earth, talcum, chalk and waxes. Preferably the matting agent is selected from the group consisting of silica, diatomaceous earth, talcum, chalk and mixtures thereof. Silica is often preferred. The silica can be treated or untreated silica, or it can be a mixture of both. Examples of inorganic matting agents include Acematt™ 3300 (a pyrogenic silica), Acematt™ TS-100, Acematt™ TS-100/20, Acematt™ HK-400, Acematt™ HK-450, Acematt™ 3600, Aerosil™ R-7200 and Aerosil™ R-9200 available from Evonik Degussa; Syloid™ ED5, Syloid™ 162C, Syloid MX™ 306 and Syloid MX™ 309 available from W.R. Grace & Co; Gasil™ ED-5, Gasil™ 23D, Gasil™ 23F, Gasil™ 35M, Gasil™ HP-230, Gasil™ HP-270, Gasil™ HP335, Gasil™ HP380, Gasil™ 937, Gasil™ EBN, Gasil™ HP-880 and SILCRON™ G-602 from PQ Corporation, Deuteron™ MK from Deuteron and CP4-8991 from Grace & Co.

Examples of suitable organic matting agents (D2) include organic waxes such as (Methylenediaminomethyletherpolycondensate) from Deuteron. Ceraflour™ 988 from BYK is an example of a micronized amide modified polyethylene wax matting agent. Other suitable examples include LANCO™ 1930 and LANCOWAX™ PP 1362D from Lubrizol, and SASOLWAX™ 5413 from Sasol.

Often a combination of at least one silica type is used. In a particular embodiment of the invention, compositions (II) hence comprise at least one inorganic matting agent (D1).

Organic solvent (E) can be used to reduce viscosity of compositions (II) of the invention. The organic solvents typically are removed by heating and drying before cure. In this instance, the heating and drying temperature is preferably, for example, 40° C. or higher to 100° C. or lower. The heating and drying time is, for example, from at least 30 seconds to at most 8 minutes, preferably from at least 1 minute to at most 5 minutes, and more preferably from at least 3 minutes to at most 5 minutes. Examples of suitable solvents have been given above (see compounds (C1)). Typically solvents, when present, are used in an amount from 0 to 80% by weight (wt %), relative to the total weight of the composition (II). Usually this amount is from 5 to 70 wt %, more preferably from 10 to 60 wt %.

Compositions (II) of the invention can hence further comprise one or more (meth)acrylated compound (F). Typically compounds (F), when present, are used in an amount from 0 to 80% by weight (wt %), relative to the total weight of the composition (II). Usually this amount is from 0 to 60 wt %, more preferably from 0 to 40 wt %.

In an embodiment of the invention, compound (F) is a reactive diluent. The reactive diluent can be the same as or can be different from (meth)acrylated compounds (C2) listed above. Compounds (F) can also be oligomeric and/or polymeric compounds. Examples thereof are: (poly)urethane (meth)acrylates, (poly)ester (meth)acrylates, (poly)ether (meth)acrylates, epoxy (meth)acrylates and/or (meth)acrylic (meth)acrylates. Such compounds are well known in the art. Preferred are (poly)urethane (meth)acrylates, (poly)ester (meth)acrylates and/or (meth)acrylic (meth)acrylates.

Compositions (II) according to the invention typically comprise at least one free-radical thermal initiator and/or at least one photoinitiator. Useful free-radical thermal initiators include, for example, azo, peroxide, persulfate, and redox initiators, and combinations thereof.

Useful free-radical photoinitiators include, for example, those known as useful in UV curing of acrylate polymers. Such initiators include aromatic ketones such as benzophenone, anthraquinone, acetophenone, benzoin and benzoin ethers, acylphosphine oxide (APO) and bisaeylphosphine oxide (BAPO) and their derivatives. Free radical photoinitiators are commercially available and include those available from BASF under the trade designation "TRGACURE", "LUCIRIN" and "DAROCUR". Combinations of two or more photoinitiators may be used. Generally, suitable initiator concentrations are from about 0, 1% to about 10% by weight, particularly suitable between about 0.5% and about 7% by weight based on the total weight of the reactive compounds a) and b). The curable composition can be cured at ambient temperature in an inert atmosphere. In a particular embodiment, the curable composition may be cured at ambient temperature in the presence of air.

In order to increase the cure speed, in particular when curing is done in the presence of air, a cure accelerator or synergist can be added in amounts up to 5% by weight based on the total weight of the curable compounds. Useful examples of cure accelerators include amino functional acrylafes, such as for example EBECRYL™ PI 16, commercially available from Allnex and Speedcure DMB {2-(dimethylamino)benzoate} available from Lambson.

Compositions (II) of the invention may further include other optional additives. For example, the compositions may include antistatic agents, wetting agents, dispersants, waxes, leveling agents, light and/or UV-stabilizers, UV-absorbers, ozon stabilizers, antioxidants, inhibitors, fillers, lubricants, pigments, dyes, flow agents and/or viscosifiers.

Compositions (II) of the invention may be applied in any possible way known in the art and suitable. They may for instance be applied by any coating technique, including the spray, curtain, dip, pad and roll-coating techniques, as well as any printing technique such as lithography, serigraphy, flexography, gravure and inkjet printing.

Throughout the invention and in the Examples Section the following measuring methods have been used to characterize the compounds and compositions of the invention as well as coatings obtained herewith:

Adhesion (cross hatch tape): The adhesion (ADH) is assessed using a cross hatch test. 5 cuts of ~1 cm long and spaced by ~1 mm are made in the coating using a knife, followed by 5 similar cuts in the transversal direction. The adhesion was measured using an adhesive tape (Scotch®) firmly pressed on the cross-cut coating and removed rapidly; the damage to the cross-cut surface area of the coating due to adhesion loss is expressed in a OB-5B scale, 5B=best. A high adhesion is necessary to ensure a strong permanent bond between the coating and the substrate. PC stands for polycarbonate. ABS stands for Acrylonitrile butadiene styrene.

Solvent resistance (acetone double rubs on PC): the solvent resistance is assessed with acetone double rubs (ADR) by pressing a cotton rag saturated with acetone with a backward and forward motion on the coated surface; one double rub is equal to a backward and forward stroke on the coated surface. The reported number is the number of double rubs required to break through the coating. A high solvent resistance (more than hundred acetone double rubs) is necessary to ensure a good protection of the coating and the substrate against any household or industrial product spillage.

Scratch resistance (steel wool on PC): the test is performed by scratching the coating with the steel wool for certain double rubs until the surfaces become hazy. The results are rated visually and recorded in a 1-5 scale: 5=no scratch; 4=very light scratch; 3=moderate scratch; 2=strong scratch; 1=very strong scratch. A high value (5) is expected to provide the best protection against any deterioration of the coated object.

RCA (Resistant Coating to Abrasion): RCA test is an abrasion resistance tests performed using a Standard paper as the abrading material. Abrasion is made by pressing the standard paper on the coating with a specific load (175 g usually). The paper is in contact with a rubber ring on the reverse side. The result is expressed as the number of cycles (corresponds to a certain length of paper) necessary before the substrate starts to show. The conventional (coloured) basecoat has a very poor RCA result (about 5 to 10 cycles), therefore it does not make a big impact on the result. It is quite easy to see the test limit by the naked eyes, as the plastic substrate is usually of a different colour than the basecoat (prerequisite of the test). RCA result is also very dependent on the thickness of the clear coating and 2 coatings have to be compared at the same thickness and applied on the same substrate.

Pencil hardness: The weight load is 750±5 grams. Graded pencils were used and a full assortment consists of several pencils of hardness ranging from 9H (hardest) to 9B (softest): "H" stands for hardness, "B" stands for blackness and HB is for hard and black pencils. The hardest is 9H, F is the middle of the hardness scale; then comes HB and 9B is the softest.

Oil marker pen resistance: the oil marker pen is drawn on cured surface of the coating. After the stain was totally dried, it could be removed by dry wipe without aggressive solvents or cleaning agents. The removability was visually judged.

Oil marker pen repeating resistance: repeat the oil marker pen resistance as above on the same place of the surface until there are traces left visually. The results were expressed by the number of cycles (the drawing and wiping off were recorded as one cycle).

Oil marker pen resistance after boiling water: the cured surface together with the substrate was placed into boiling water (100° C.) for 1 hour. Then it was taken out for oil marker pen repeating resistance after the water was removed. The results were expressed by the number of cycles (the drawing and wiping off were recorded as one cycle).

Leveling: The film was visually judged on the presence of defects and scored from 0 to 5. A score 5 corresponds to a coating without defects.

UV curing: Curing was done in the following way: 6-120 µm thick coating layers were applied on Leneta paper opacity cards with a bar coater. Coatings were then cured under UV lights at a cure speed of 5 m/min using 40, 80 or 120 Watt/cm$^2$ Hg lamps.

Curing speed: Reactivity: a film of 25 µm is applied on white non absorbing paper and exposed to UV radiations from a 80 W/cm non focalized medium pressure mercury lamp at a defined conveyer speed. The conveyer speed is varied in order to determine the maximum conveyer speed to be used to obtain a fully cured film. The fully cured character of the film is assessed by putting some talc on the surface and rubbing with a finger and then with a cotton. As long as a mat aspect is observed, the film is not fully cured and the conveyer speed must be lowered. The coating is also submitted to 50 double rubs with a wad of cotton drenched in acetone. A fully cured film is not visually affected by this test. The UV-dose (expressed in conveyer speed (m/min) with determined lamp power (W/m)) necessary to pass the two tests is referred to as the reactivity of the coating Gloss measurements: Throughout the invention and also here gloss measurements were done with a BYK Gardner micro TRI-gloss 20-60-85 gloss-meter in accordance with DIN-67530.

Yellowing: a film of 25 µm is applied on white non absorbing paper, cured and exposed to the UV light of an Ultra-Vialux 300 W lamp in a completely closed drum. The distance between the lamp and the samples is 50 cm. Yellowing (delta b) is measured with an apparatus type Supercolor immediately after UV exposure and after 48 hours of exposition and compared with the initial yellowing (right after exposure).

The invention is now further described in more details in the following Examples, which in no way intend to limit the invention or its applications.

Preparation Example 1

Charge 208.4 g IPDI, suitable stabilizers and catalyst into the reactor and heat to 45° C. Start alimentation of PETIA 666.1 g and keep max temperature below 65° C. After alimentation, keep temperature at 60° C. for 3 hours. Add 459 g of a polydimethyl siloxane bearing terminal hydroxyl groups into the reactor and keep the temperature at 50° C. for 3 hours. Add 517.5 g methyl isobutyl ketone, into reactor and keep stirring until fully homogeneous to obtain final product with solid content about 70 wt %.

Various polydimethyl siloxanes were tested, see Table 1.

TABLE 1

| | |
|---|---|
| PETIA/IPDI/ siloxane 1 | Siloxane 1 is a polydimethyl siloxane diol with 10 repeating units |
| PETIA/IPDI/ siloxane 2 | Siloxane 2 is a difunctional Si and F containing polyol. OH value is 45-55 mg KOH/g |
| PETIA/IPDI/ siloxane 3 | Siloxane 3 is a polydimethyl siloxane diol with ethoxy groups. The primary OH content is 1.7% by weight |
| PETIA/IPDI/ siloxane 4 | Siloxane 4 is a polydimethyl siloxane diol with ethoxy groups. OH value is about 40-55 mg KOH/g |
| PETIA/IPDI/ siloxane 5 * | Siloxane 5 is a polydimethyl siloxane diol with ethoxy groups. OH value is about 48-58 mg KOH/g |

TABLE 1-continued

| | |
|---|---|
| PETIA/IPDI/ siloxane 6 | Siloxane 6 is a polydimethyl siloxane diol with ethoxy groups. OH value is about 65-75 mg KOH/g |
| PETIA/IPDI/ siloxane 7 | Siloxane 7 is a polydimethyl siloxane diol with ethoxy groups. OH value is about 55-70 mg KOH/g |
| PETIA/IPDI/ siloxane 8 | Siloxane 8 is a polydimethyl siloxane diol with ethoxy groups. OH value is about 50-65 mg KOH/g |
| PETIA/IPDI/ siloxane 9 | Siloxane 9 is a polydimethyl siloxane diol with ethoxy and propoxy groups. OH value is about 20-30 mg KOH/g |

Formulations 1-4

Coating compositions were prepared by mixing the components as given in the table below with high speed stirrer. The coating compositions were coated with spray coating application to specific substrates indicated below. The panels were flashed off at 60° C. for 3 min and then UV exposed with 5 m/min for 2 passes with 120 W/cm UV lamp.

Amounts are in grams (parts) unless otherwise specified.

TABLE 2

Formulation 1 and results: pure resin evaluation

| | | | |
|---|---|---|---|
| Formulation 1 | Resin from Example 1 | | 95 |
| | ADDITOL CPK | | 5 |
| Results (About 12 um dry film thickness, if not indicated) | Curing speed (m/min) | | 40 |
| | Gloss (at 60 degree) | | 91.4 |
| | Adhesion | PC | 0 B |
| | | ABS | 5 B |
| | | ABS + PC | 5 B |
| | Hardness | PC | HB– |
| | | ABS | HB |
| | RCA (10 um dry film thickness) | | 80 |
| | Yellowing | Δb right after UV exposure | −2.16 |
| | | Δb after 48 hours | −2.25 |
| | Leveling (20 um, grade 5 is the best) | | 5 |

TABLE 3

Formulation 2 and results: high gloss coating evaluation

| | | |
|---|---|---|
| Formulation 2 | Resin from Example 1 | 60 |
| | PETIA | 40 |
| | ADDITOL CPK | 5 |
| | Butyl acetate | 80 |
| Results (About 20 um dry film thickness, if not indicated) | General oil marker pen resistance (0~5 grade, 5 is best) | 5 |
| | Oil marker pen repeating resistance | More than 30 times |
| | Oil marker pen resistance after boiling water | 20 times |
| | Oil marker pen resistance after steel wool scratch | 10 rubs is good |
| | Leveling (5 is the best) | 5 |
| | Hardness | F |
| | RCA(175 g, 10 um) | >300 times |
| | Adhesion/PC | 5 B |

TABLE 4

Formulation 3 & 4 and results: low gloss coating evaluation

| | | Formulation 3 | Formulation 4 |
|---|---|---|---|
| Formulation 3 & 4 | Resin from Example 1 | 50 | 40 |
| | Resin from Example 3 | — | 10 |
| | Evonik matting agent ACEMATT 3600 | 1.5 | 1.5 |
| | Tosoh matting agent E-1011 | 2.5 | 2.5 |
| | ADDITOL CPK | 2 | 2 |
| | Butyl acetate | 40 | 40 |
| Results (About 20 um dry film thickness, if not indicated) | Gloss/60 degree at black PC | 8.4 | 6.2 |
| | Gloss/60 degree at white PC | 11.2 | 8.3 |
| | General oil marker pen resistance (0~5 grade, 5 is best) | 4.5 | 3.5 |
| | Oil marker pen repeating resistance | 18 times | 12 times |
| | Oil marker pen resistance after boiling water | 5 times | 5 times |
| | Hardness/PC | F | F |
| | RCA(10 um, 175 g) | 235 | 290 |
| | Matting agent compatibility | 2 | 3.5 |
| | Leveling (5 is the best) | 5 | 5 |

Preparation Example 2: Preparation of Compound (A) with Later Addition of Compounds (B)

Charge 88.9 g IPDI, suitable stabilizers and catalyst into the reactor and heat to 45° C. Start alimentation of 408 g of the same polydimethyl siloxane as used in Example 1 (*). After alimentation, keep temperature at 50° C. for 3 hours. Add 193.8 g PETIA into the reactor and keep the temperature at 60° C. for 6 hours to obtain compound (A).

Then charge another part of PETIA (pentaerythritol tri/tetra acrylate) 387.6 g, 88.92 g IPDI, suitable stabilizers and catalyst into the reactor and heat to 80° C. for 7 h to obtain a compound (B), Blended with Compound (A).

Preparation Example 3: Preparation of Compound (A) Including Compound (iv)

Charge 23 g IPDI, suitable stabilizers and catalyst into the reactor and heat to 45° C. Start alimentation of 253 g of the siloxane 9. After alimentation, keep temperature at 50° C. for 3 hours. Add 24.9 g of Placcel FA2D (Daicel Corporation) into the reactor and keep the temperature at 60° C. for 3 hours. Then charge 1500 g of Ebecryl 1200 (Allnex) with suitable stabilizer and catalyst and react further for 4 hrs at 60° C. to obtain example 3.

Results obtained with resins according to Preparation Examples 1, 2 and 3 are given in the following Tables above and below:

TABLE 5

Formulations 5 and 5' and results: pure resin evaluation

|  |  | Example 1 Formulation 5 | Example 2 Formulation 5' |
|---|---|---|---|
| Formulation | Resin from Example 1/2 | 95 | |
|  | ADDITOL CPK | 5 | |
| Results (About 12 um dry film thickness, if not indicated) | General oil marker pen resistance | 5 | 3 |
|  | Oil marker pen repeating resistance | >30 times | 15 times |
|  | Oil marker pen resistance after boiling water | 15 times | 5 times |
|  | Curing speed (m/min) | 46 | 40 |
|  | Gloss (at 60 degree) | 90.4 | 90.7 |
|  | Adhesion  PC | 5 B | 5 B |
|  | ABS | 5 B | 5 B |
|  | ABS + PC | 5 B | 5 B |
|  | Hardness  PC | HB | HB− |
|  | ABS | HB | HB− |
|  | RCA (10 um dry film thickness) | 130 | 25 |
|  | Yellowing  Δb right after UV exposure | 0.69 | 0.88 |
|  | Δb after 48 hours | 0.51 | 1.08 |
|  | Leveling (20 um, grade 5 is the best) | 5 | 5 |

TABLE 6

Formulations 6 and 6' and results: high gloss coating evaluation

|  |  | Example 1 Formulation 6 | Example 2 Formulation 6' |
|---|---|---|---|
|  | Resin from Example 1/2 | 60 | |
|  | PETIA | 40 | |
|  | ADDITOL CPK | 5 | |
|  | Butyl acetate | 80 | |
| Results (About 20 um dry film thickness, if not indicated) | General oil marker pen resistance (0~5 grade, 5 is best) | 5 | 3 |
|  | Oil marker pen repeating resistance | More than 30 times | More than 30 times |
|  | Oil marker pen resistance after boiling water | 20 times | 10 times |
|  | Oil marker pen resistance after steel wool scratch | 10 rubs is good | 2 rubs is good |
|  | Leveling (5 is the best) | 5 | 5 |
|  | Hardness | F | F |
|  | RCA(175 g, 10 um) | >300 times | >300 |
|  | Adhesion/PC | 5 B | 5 B |

TABLE 7

Formulations 7 and 7' and results: low gloss coating evaluation

|  |  | Example 1 Formulation 7 | Example 2 Formulation 7' |
|---|---|---|---|
| Formulation 3 | Resin from Example 1/2 | 50 | |
|  | Evonik matting agent ACEMATT 3600 | 1.5 | |
|  | Tosoh matting agent E-1011 | 2.5 | |
|  | ADDITOL CPK | 2 | |
|  | Butyl acetate | 40 | |
| Results (About 20 um dry film thickness, if not indicated) | Gloss/60 degree at black PC | 7.8 | 8.2 |
|  | Gloss/60 degree at white PC | 10.2 | 11.3 |
|  | General oil marker pen resistance (0~5 grade, 5 is best) | 4.5 | 2.5 |
|  | Oil marker pen repeating resistance | 18 times | 5 times |
|  | Oil marker pen resistance after boiling water | 5 times | 1 times |
|  | Hardness/PC | F | F |
|  | RCA(10 um, 175 g) | 260 | 50 |
|  | Matting agent compatibility | 2 | 2 |
|  | Leveling(5 is the best) | 5 | 5 |

The invention claimed is:

1. A radiation curable composition (I) comprising:
   from 10 to 80% by weight of at least one silicone-modified urethane (meth)acrylate (A),
   from 0.5 to 60% by weight of at least one (meth)acrylated compound (B) bearing at least 5 (meth)acryloyl groups per molecule, and
   optionally, from 0 to 60% by weight of at least one compound (C) different from (A) and (B),
   wherein the weight percentages are based on the total weight of the composition (I),
   wherein the silicone-modified urethane (meth)acrylate (A) is prepared by reacting:
   (i) at least one polysiloxane having at least two isocyanate reactive groups,
   (ii) at least one polyisocyanate, and
   (iii) at least one compound having at least one (meth)acryloyl group and at least one isocyanate reactive group, and
   wherein the silicone-modified urethane (meth)acrylate (A) is prepared by reacting, in a first step, the at least one polyisocyanate (ii) with the at least one compound having at least one (meth)acryloyl group and at least one isocyanate reactive group (iii), and then by reacting, in a further step, the reaction product of the first step with the at least one polysiloxane having at least two isocyanate reactive groups (i),
   wherein, in the first step, the molar equivalent ratio of the isocyanate groups in the at least one polyisocyanate (ii) to the hydroxyl groups of the at least one compound having at least one (meth)acryloyl group and at least one isocyanate reactive group (iii) is from 2:1 to 1.1:1.

2. The radiation curable composition (I) according to claim 1, wherein the molar equivalent ratio of the at least one compound having at least one (meth)acryloyl group and at least one isocyanate reactive group (iii) to the at least one polysiloxane having at least two isocyanate reactive groups (i) is from 2:1 to 10:1.

3. The radiation curable composition (I) according to claim 1, wherein the at least one polysiloxane having at least two isocyanate reactive groups (i) comprises between 5 and 100 —SiO— units.

4. The radiation curable composition (I) according to claim 1, wherein the at least one polysiloxane having at least two isocyanate reactive groups (i) is selected from the group consisting of polydialkyl siloxanes, polyalkylaryl siloxanes, polydiaryl siloxanes, and mixtures thereof.

5. The radiation curable composition (I) according to claim 1, wherein the at least one polysiloxane having at least two isocyanate reactive groups (i) is a polydialkyl siloxane bearing terminal hydroxyl groups.

6. The radiation curable composition (I) according to claim 1, wherein the at least one (meth)acrylated compound (B) bears from 6 to 15 (meth)acryloyl groups per molecule.

7. The radiation curable composition (I) according to claim 1, wherein at least one (meth)acrylated compound (B) has a degree of unsaturation of at least 4 meq/g and at most 12 meq/g.

8. The radiation curable composition (I) according to claim 1, wherein the at least one (meth)acrylated compound (B) is selected from the group consisting of urethane (meth)acrylates (B1), polyester (meth)acrylates (B2), (meth)acrylated poly(meth)acrylics (B3), and mixtures thereof.

9. A coating composition, an ink or an overprint varnish comprising the radiation curable composition (I) according to claim 1.

10. A coating composition (II) comprising from 5 to 95% by weight of the radiation curable composition (I) according to claim 1, and from 0.5 to 30% by weight of at least one organic and/or inorganic matting agent (D).

11. The coating composition (II) according to claim 10, wherein, after curing, the coating composition (II) has a gloss level at 60° of at most 15.

12. An article or substrate coated, at least in part, with the coating composition (II) according to claim 10.

13. A substrate coated, at least in part, with the coating composition (II) according to claim 10, wherein the substrate is selected from the group consisting of fabric, glass, metal, metalloid, metal oxide, ceramic, wood, plastic, resin, rubber, stone, concrete, fittings in electronics, a semiconductor, a particle, and combinations thereof.

14. The radiation curable composition (I) according to claim 1, wherein, in the first step, the molar equivalent ratio of the isocyanate groups in the at least one polyisocyanate (ii) to the hydroxyl groups of the at least one compound having at least one (meth)acryloyl group and at least one isocyanate reactive group (iii) is from 1.8:1 to 1.2:1.

* * * * *